United States Patent [19]
Adcock

[11] Patent Number: 5,764,797
[45] Date of Patent: Jun. 9, 1998

[54] METHOD AND SYSTEM FOR MODELING HANDWRITING USING POLYNOMIALS AS A FUNCTION OF TIME

[75] Inventor: James L. Adcock, Bellevue, Wash.

[73] Assignee: Microsoft Corporation, Redmond, Wash.

[21] Appl. No.: 428,412

[22] Filed: Apr. 25, 1995

[51] Int. Cl.$^6$ .............................. G06K 9/00; G06K 9/48; G06K 9/46; G06K 9/36

[52] U.S. Cl. .................... 382/187; 382/198; 382/203; 382/241

[58] Field of Search ................................. 382/181, 182, 382/184, 186–189, 241, 137, 195, 197, 198, 201, 203, 122, 123; 395/141; 345/441

[56] References Cited

U.S. PATENT DOCUMENTS

| | | | |
|---|---|---|---|
| 4,701,960 | 10/1987 | Scott | 382/197 |
| 5,040,222 | 8/1991 | Muroya | 382/215 |
| 5,050,219 | 9/1991 | Maury | 382/3 |
| 5,105,468 | 4/1992 | Guyon et al. | 382/187 |
| 5,285,506 | 2/1994 | Crooks et al. | 382/189 |
| 5,287,417 | 2/1994 | Eller et al. | 382/293 |
| 5,365,598 | 11/1994 | Sklarew | 382/189 |
| 5,369,737 | 11/1994 | Gholizadeh et al. | 395/126 |
| 5,491,758 | 2/1996 | Bellegarda et al. | 382/188 |
| 5,502,774 | 3/1996 | Bellegarda et al. | 382/187 |
| 5,528,699 | 6/1996 | Obata et al. | 382/187 |

OTHER PUBLICATIONS

C. Tappert, *Research Report, An Adaptive System for Handwriting Recognition*, RC 11175 (#50249) May 21, 1985, Computer Sciences Department, IBM T.J. Watson Research Center, Yorktown Heights, New York 10598, pp. 1–15.

William H. Press et al, *Numerical Recipes in C, The Art of Scientific Computing*, Second Edition, Cambridge University Press, Press Syndicate of the University of Cambridge, 1988, 1992.

Information Services, *Articles on the future of handwriting recognition*, Computer Select, Apr. 1994, Copyright Seybold Publications Inc. 1994, pp. 1–9.

Information Services, *Reviews of products using handwriting recognition*, Computer Select, Apr. 1994, Copyright Coastal Associates Publishing LP, 1994, pp. 1–24.

(List continued on next page.)

*Primary Examiner*—Bipin Shalwala
*Attorney, Agent, or Firm*—Seed and Berry LLP

[57] ABSTRACT

A method and system for modeling handwriting using polynomials as a function of time. In a preferred embodiment, a user inputs handwriting by writing with an electronic pen on an electronic tablet. The tablet samples the location of the tip of the pen on the tablet from pen down until pen up at periodic intervals as each stroke in a character is written and inputs the (x,y) coordinates for each stroke in the character to a normalizer. The normalizer normalizes the (x,y) coordinates and inputs the normalized (x,y) coordinates to a featurizer. The featurizer generates a set of features that represent each stroke in the character. In the preferred embodiment, the features are coefficients of a Chebyshev. After the Chebyshev coefficients have been generated for each stroke in the character, the featurizer normalizes the set of Chebyshev coefficients. During training, the normalized Chebyshev coefficients are input to a prototype generator. After receiving all of the input samples for a given character and the corresponding set of Chebyshev coefficients for each sample, the prototype generator generates one or more prototypes of the given character and stores the prototype(s) in a database. During recognition, the normalized Chebyshev coefficients are input to a classifier. After receiving the set of Chebyshev coefficients for a character to be recognized, the classifier compares the set of Chebyshev coefficients to the prototypes stored in the database to find an acceptable match. If an acceptable match is found, the character corresponding to the matching prototype is output.

15 Claims, 13 Drawing Sheets

OTHER PUBLICATIONS

Information Services, *Products using handwriting recognition*, Computer Select, Apr. 1994, Data Sources Report, Copyright Ziff–Davis Publishing Co. 1994, pp. 1–41.

Ron White, *Handwriting Recognition*, PC/Computing, Dec. 1993, pp. 378–379.

Diana Hwang, *Emerging Technologies–Handwriting recognition at issue*, Computer Reseller News, Dec. 13, 1993, pp. 75 & 78.

David H. Freedman, *Recognizing Handwriting in Context*, Science, vol. 260, Jun. 18, 1993, p. 1723.

John M. Hollerbach, *An Oscillation Theory of Handwriting*, Biological Cybernetics, Massachusetts Institute of Technology, vol. 39, 1981, pp. 139–156.

David E. Rumelhart, *Theory to Practice: A Case Study—Recognizing Cursive Handwriting*, Computational Learning & Cognition, Proceedings of the Third NEC Research Symposium, pp. 177–196.

Mark Lewyn, *Teaching Computers to Tell a G from a C*, Science & Technology, Business Week, Dec. 7, 1992, pp. 118–119.

Tom R. Halfhill, *PDA's Arrive (But Aren't Quite Here Yet)*, Byte, Oct. 1993, pp. 66–94.

Charles C. Tappert et al., *The State of the Art in On–Line Handwriting Recognition*, IEEE, Transactions on Pattern Analysis and Machine Intelligence, vol. 12, No. 8, Aug. 1990, pp. 787–808.

John H. Wolfe, *NORMIX: Computational Methods For Estimating the Parameters of Multivariate Normal Mixtures of Distributions*, U.S. Naval Personnel Research Activity, San Diego, California, Aug. 1967, pp. 1–30 (2 forms attached).

"Polynomial Discriminant Method For Handwritten Digit Recognition" by Uma Srinivasan, State University at Buffalo, Dec. 14, 1989.

| X | Y |
|---|---|
| 1667 | 1688 |
| 1667 | 1682 |
| 1671 | 1676 |
| 1671 | 1668 |
| 1671 | 1660 |
| 1673 | 1644 |
| 1673 | 1626 |
| 1679 | 1602 |
| 1679 | 1582 |
| 1679 | 1554 |
| 1677 | 1528 |
| 1655 | 1494 |
| 1645 | 1472 |
| 1621 | 1450 |
| 1591 | 1442 |
| 1563 | 1442 |
| 1527 | 1444 |
| 1467 | 1468 |
| 1441 | 1494 |
| 1411 | 1532 |
| 1385 | 1588 |
| 1359 | 1648 |
| 1335 | 1708 |
| 1313 | 1806 |
| 1303 | 1878 |
| 1303 | 1938 |
| 1303 | 1980 |
| 1309 | 2024 |
| 1331 | 2080 |
| 1351 | 2094 |
| 1375 | 2116 |
| 1401 | 2116 |
| 1427 | 2112 |
| 1451 | 2096 |
| 1481 | 2042 |
| 1505 | 1986 |
| 1527 | 1928 |
| 1543 | 1864 |
| 1557 | 1802 |
| 1571 | 1748 |
| 1591 | 1684 |
| 1601 | 1660 |
| 1609 | 1642 |
| 1613 | 1654 |
| 1613 | 1678 |
| 1613 | 1746 |
| 1617 | 1798 |
| 1623 | 1852 |
| 1637 | 1900 |
| 1651 | 1932 |
| 1673 | 1978 |
| 1693 | 2004 |
| 1719 | 2028 |
| 1757 | 2054 |
| 1799 | 2074 |
| 1843 | 2090 |
| 1921 | 2116 |
| 1973 | 2132 |

*Fig. 6*

| X | Y |
|---:|---:|
| 368 | -376 |
| 368 | -399 |
| 384 | -421 |
| 384 | -451 |
| 384 | -481 |
| 391 | -542 |
| 391 | -609 |
| 414 | -700 |
| 414 | -775 |
| 414 | -880 |
| 406 | -978 |
| 323 | -1106 |
| 286 | -1189 |
| 195 | -1272 |
| 82 | -1302 |
| -22 | -1302 |
| -158 | -1295 |
| -384 | -1204 |
| -481 | -1106 |
| -594 | -963 |
| -692 | -752 |
| -790 | -527 |
| -880 | -301 |
| -963 | 67 |
| -1001 | 338 |
| -1001 | 564 |
| -1001 | 722 |
| -978 | 888 |
| -896 | 1099 |
| -820 | 1152 |
| -730 | 1234 |
| -632 | 1234 |
| -534 | 1219 |
| -444 | 1159 |
| -331 | 956 |
| -240 | 745 |
| -158 | 527 |
| -97 | 286 |
| -45 | 52 |
| 7 | -150 |
| 82 | -391 |
| 120 | -481 |
| 150 | -549 |
| 165 | -504 |
| 165 | -414 |
| 165 | -158 |
| 180 | 37 |
| 203 | 240 |
| 256 | 421 |
| 308 | 542 |
| 391 | 715 |
| 466 | 813 |
| 564 | 903 |
| 707 | 1001 |
| 865 | 1076 |
| 1031 | 1136 |
| 1325 | 1234 |
| 1520 | 1295 |

*Fig. 10*

| coefficient of: | T0 | T1 | T2 | T3 | T4 | T5 | T6 | T7 | T8 | T9 |
|---|---|---|---|---|---|---|---|---|---|---|
| X | 230 | 315 | 763 | 127 | -155 | 214 | 149 | -106 | -30 | 36 |
| Y | 75 | 881 | 184 | -88 | 498 | 70 | -499 | -77 | 266 | 94 |

*Fig. 13*

METHOD AND SYSTEM FOR MODELING HANDWRITING USING POLYNOMIALS AS A FUNCTION OF TIME

FIELD OF THE INVENTION

This invention relates generally to modeling handwriting and, more particularly, to a method and system for recognizing handwriting using polynomials as a function of time.

BACKGROUND OF THE INVENTION

A variety of handwriting recognition systems have been developed. These systems enable computers to understand handwriting. This ability is useful for inputting commands or data into computers without the use of keyboards. Handwriting recognition generally involves two phases: training and recognition.

During training, these systems typically "learn" handwriting by inputting a large sample of handwriting and by generating prototypes of the handwriting. A prototype is a model that represents particular handwriting and is used to recognize handwriting. The systems first define a set of allowable characters (e.g., letters, numbers, and editing symbols). The systems then input a number of handwritten samples of each allowable character and generate certain features that represent each sample. Examples of some features that have been generated in prior systems include end points and wire center of gravity of fitted semi-elipses and low-order Fourier series. The systems then generate one or more prototypes of each allowable character from the features representing the samples of each character.

During recognition, the systems attempt to recognize input handwriting by comparing the handwriting to the prototypes generated during training and by finding an acceptable match. The systems input handwriting to be recognized and generate the features that represent each character in the handwriting. The systems then compare the features representing each character in the handwriting to the prototypes to find an acceptable match. If an acceptable match is found, the character corresponding to the matching prototype is the recognized character. Otherwise, an indication is generated that the character could not be recognized.

The efficiency and accuracy of a handwriting recognition system can be greatly affected by the features that are generated to represent the handwriting. If the features generated from the handwriting are a compact representation, the amount of memory required to store these features will be reduced and the subsequent classification of the handwriting will be more efficient. However, if the features are too compact, they may not adequately represent the handwriting and thus, may not accurately distinguish one character from another. Therefore, a handwriting recognition system that both efficiently and accurately represents handwriting is desired.

SUMMARY OF THE INVENTION

One aspect of the present invention provides a method and a system for representing handwritten data. In a preferred embodiment, the system inputs a plurality of (x,y) coordinates representing the handwritten data. Each (x,y) coordinate has an associated time. The associated time represents a time in which the (x,y) coordinate was written during handwriting of the handwritten data. The system then generates coefficients for a polynomial to approximate the x coordinates as a function of time, and generates coefficients for a polynomial to approximate the y coordinates as a function of time. The generated coefficients are then used as a representation of the handwritten data. In a preferred embodiment, the coefficients for a Chebyshev polynomial are generated.

In another aspect of the present invention, a method and system for recognizing handwriting is provided. The handwriting is typically written on an electronic tablet using an electronic pen. The handwriting comprises at least one character, and each character comprises one or more strokes. For each stroke in each character, the system obtains (x,y) coordinates representing the location of a pen tip on an electronic tablet from pen up until pen down at periodic intervals as a stroke is written. The system then normalizes the (x,y) coordinates to account for time and size variations in the handwriting. The system then generates coefficients of a polynomial, preferably a Chebyshev polynomial, to approximate the normalized coordinates. The system then compares the generated coefficients for all strokes in the character to stored prototypes of characters. When the generated coefficients match a prototype, the system recognizes the handwritten data as the character corresponding to the prototype.

BRIEF DESCRIPTION OF THE DRAWING

FIG. 6 is a table of the (x,y) coordinates representing the character of FIG. 5;

FIG. 10 is a table of the normalized (x,y) coordinates representing the normalized character of FIG. 9;

FIG. 13 is a table of the Chebyshev coefficients representing the character of FIG. 5.

DESCRIPTION OF THE PREFERRED EMBODIMENTS

Figure 1:
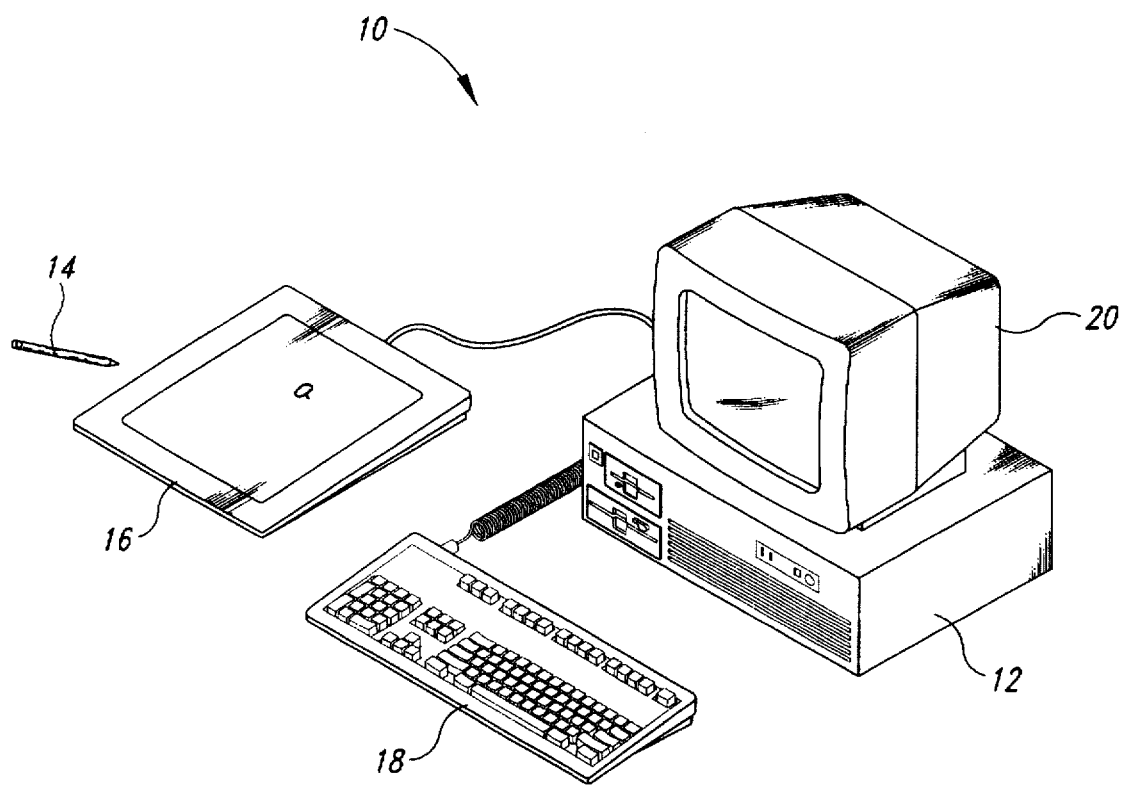
FIG. 1 is a perspective view illustrating a handwriting recognition system incorporating the principles of the present invention.

A preferred embodiment of the present invention provides a method and system for modeling handwriting. In a preferred handwriting modeling system, a user inputs handwriting by writing with an electronic pen on an electronic tablet. The modeling system samples the location ((x,y) coordinates) of the tip of the pen on the tablet from pen down until pen up at periodic intervals as each stroke of a character is written. The modeling system uses the series of (x,y) coordinates provided by the tablet and the sampling interval to generate the model for the handwriting. To model the handwriting, the modeling system uses a polynomial approximation (curve-fitting) technique to represent the series of x coordinates as a function of time and the series of y coordinates as a function of time. The modeling system generates a set of coefficients of a polynomial function to represent the series of x coordinates and another set of coefficients of a polynomial function to represent the y coordinates. The sets of coefficients for the x and y coordinates represent the model of the handwriting. The model can be used in handwriting recognition and can also be used as a technique for storing a compressed representation of the handwriting. When used as a compressed representation, the handwriting can later be displayed by using the sets of coefficients with the polynomial functions to generate the (x,y) coordinates for the handwriting.

In one embodiment, the modeling system is integrated with a handwriting recognition system. The recognition system receives the (x,y,) coordinates. The recognition system normalizes the position of the character by subtracting out the average of the x coordinates from each x coordinate and the average of the y coordinates from each y coordinate. The recognition system then normalizes the size of the character by dividing each x coordinate by the variance of the x coordinates and each y coordinate by the variance of the y coordinates. The recognition system generates a polynomial approximation of the normalized (x,y) coordinates by generating coefficients for the polynomial. The coefficients that are generated represent a polynomial approximation of the handwriting.

During training, a prototype generator inputs a variety of sample handwritings for each character. The coefficients for each sample are generated. Either these coefficients or some average of these coefficients are stored in a database as prototypes of the character.

During recognition, the coefficients representing handwriting to be recognized are input to a classifier. After receiving the coefficients for a character to be recognized, the classifier compares the coefficients to the prototypes stored in the database to find an acceptable match. If an acceptable match is found, the handwriting is recognized as the character corresponding to the matching prototype. Otherwise, an indication of non-recognition is generated.

In a preferred embodiment, a family of polynomials of various orders are used in the polynomial approximations. A single coefficient is generated for each polynomial in the family. The handwriting is approximated by a function that is the sum of the polynomials with a coefficient applied to each polynomial in the family. In a preferred embodiment, the family of polynomials is the Chebyshev polynomial family. Each of the coefficients represents a "feature" of the handwriting. Chebyshev polynomials are particularly well-suited as an approximating function for handwriting because they can be implemented using integer arithmetic, and result in fast execution with acceptable numerical accuracy.

A preferred embodiment of the handwriting modeling system is described as integrated with a handwriting recognition system. Further, the described preferred embodiment uses the family of Chebyshev polynomials to model handwriting. FIG. 1 illustrates the handwriting recognition system 10 incorporating the principles of the present invention. The system 10 includes a computer 12 that controls the operation of the system. The computer 12 includes a central processing unit and memory (neither shown). A user inputs handwriting by writing with an electronic pen 14 on an electronic tablet 16. The tablet 16 obtains data representing the handwriting on the tablet and inputs the data to the computer 12. The handwriting data that the tablet 16 obtains is data representing the x and y motions of the pen 14 as a function of time as the handwriting is written. When the computer 12 receives the handwriting data, the computer processes the handwriting data.

First, the computer 12 normalizes the data. The normalization of the handwriting data includes normalization of the time duration, the position, and the size of the handwriting. The normalization of the handwriting data allows the recognition system to recognize characters regardless of the size of the handwritten character and speed at which the character is handwritten. After normalization, the handwriting data is independent of the time duration, position, and size of the actual handwriting. Next, the computer 12 generates certain features that represent the handwriting data. The generation of features that represent the handwritten data includes, in the preferred embodiment, generation of Chebyshev coefficients that represent the handwriting. The Chebyshev coefficients approximate the x and y motions of the pen 14 as a function of time. Lastly, during training, the computer 12 generates prototypes of the handwriting data and, during recognition, the computer 12 classifies the handwriting data. A keyboard 18 and a display device 20 are also used to enter and display data, in particular, non-handwritten data.

Figure 2:
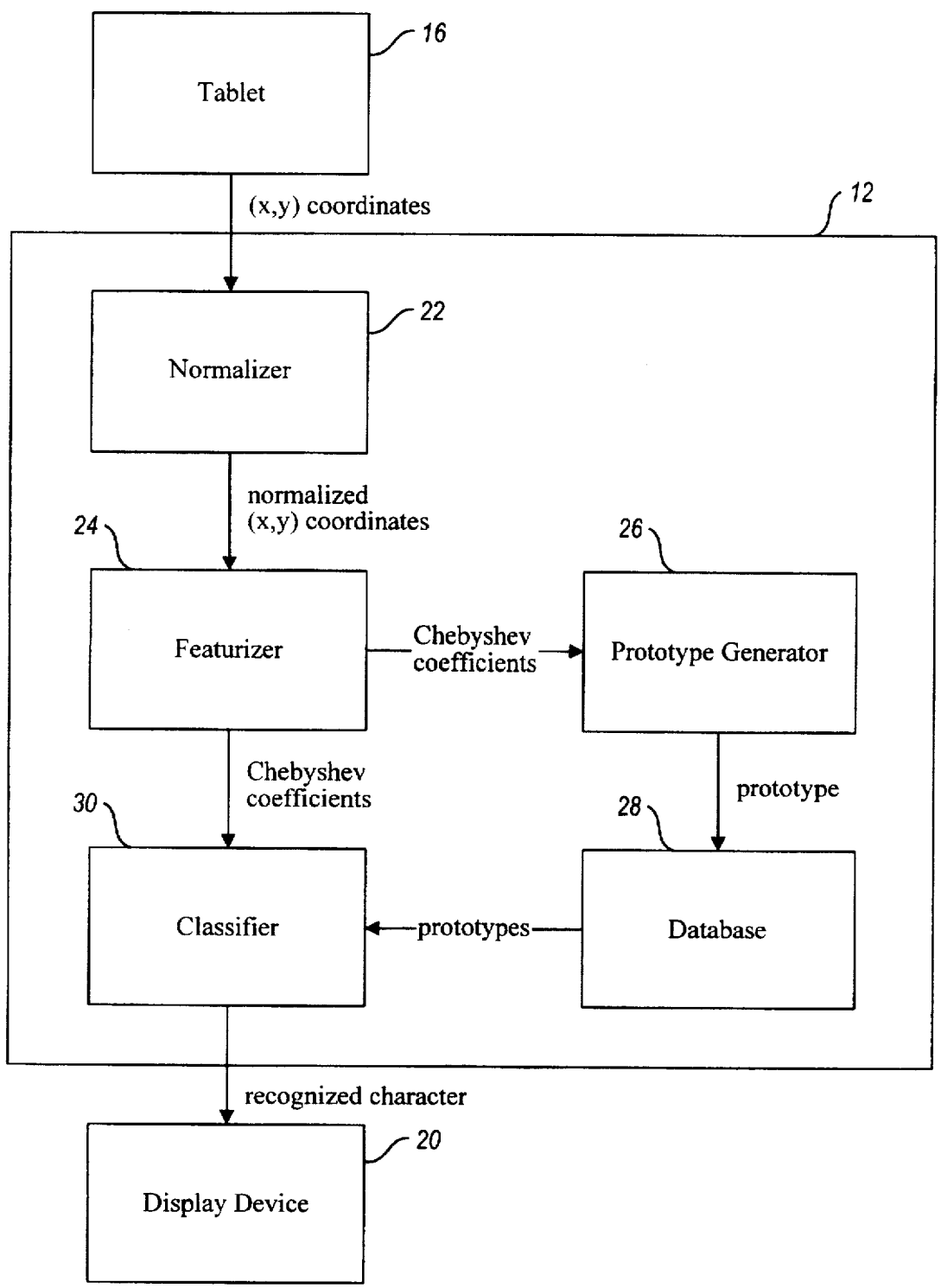
FIG. 2 is a block diagram illustrating the components of a computer in the system of FIG. 1.

The components of the computer 12 are illustrated in greater detail in FIG. 2. Initially, the tablet 16 samples the location of the tip of the pen 14 on the tablet and inputs the digital (x,y) coordinates of the pen tip to the computer 12. The location of the pen tip is sampled from pen down until pen up at periodic intervals as each stroke in a character is written. Typical sampling rates vary from 50 to 200 samples per second, with a preferred sampling rate being 100 samples per second. The (x,y) coordinates representing each stroke in the character are stored in two arrays, x[j] and y[j]. Thus, there is a pair of arrays for each stroke in the character, and the size of these arrays is equal to the number of samples in the corresponding stroke.

The recognition system generates a polynomial approximation of each stroke of a character. The combined polynomial approximations of the strokes represent the character. After receiving the (x,y) coordinates for each stroke in the character from the tablet 16, the computer 12 processes the coordinates. First, a normalizer 22 normalizes the (x,y) coordinates.

Specifically, the normalizer 22 normalizes the time duration of each stroke in the character by mapping each coordinate to time within a predefined time interval and normalizes the position and size of the character. The time duration normalization is performed separately on each stroke in the character, whereas the position and size normalizations are performed simultaneously on all of the strokes in the character as a whole. The resulting normalized (x,y) coordinates representing the character are independent of the time duration, position, and size of the written character.

The normalized (x,y,) coordinates are input to a featurizer 24. The featurizer 24 generates a set of features that represent each stroke in the character. In the preferred embodiment, the features are Chebyshev coefficients. The Chebyshev coefficients are generated using the method of least squares applied independently to the normalized x coordinates versus time and to the normalized y coordinates versus time. Chebyshev coefficients and the methods used to generate them, in particular, the method of least squares, are well-known in the art. One text that discusses Chebyshev polynomials and least squares, and includes algorithms relating to each, is *Numerical Recipes in C, The Art of Scientific Computing*, Second Edition, by William H. Press, Saul A. Teukolsky, William T. Vetterling, and Brian P. Flannery, §§ 5.8–5.11 and 15.4, pp. 190–200 and 671–79. After the Chebyshev coefficients have been generated for each stroke in the character, the featurizer 24 normalizes the set of Chebyshev coefficients such that the sum of the squares of the Chebyshev coefficients equals one.

During training, the normalized Chebyshev coefficients are input to a prototype generator 26. After the prototype generator 26 has received all of the input samples for a given character and the corresponding set of Chebyshev coefficients for each sample, the prototype generator generates one or more prototypes of the given character and stores the prototype(s) in a database 28. In a simple system, the set of Chebyshev coefficients for each sample is stored as a prototype. Such a system is not very efficient because, during recognition, a character to be recognized must be compared to each prototype to find an acceptable match. Thus, more complex systems have been developed in which a number of samples are represented using a single prototype. In one such system, all of the samples for a given character are grouped into classes and a prototype is generated for each class. This system is more efficient because there are fewer prototypes for the same number of samples. Additionally, rather than using the set of Chebyshev coefficients for each sample to generate the prototypes, the set of Chebyshev coefficients for each sample can be reduced to a smaller set of features and the smaller set of features can be used to generate the prototypes. A variety of systems for generating prototypes have been developed and are well-known in the art. A preferred prototype generator is normal mixture densities. ("U.S. Naval Personnel Research Activity," *Normix: Computational Methods For Estimating the Parameters of Multivariate Normal Mixtures of Distributions*, John W. Wolfe, August 1967.)

During recognition, the normalized Chebyshev coefficients are input to a classifier 30. After the classifier has received the set of Chebyshev coefficients for a character to be recognized, the classifier 30 compares the set of Chebyshev coefficients to the prototypes stored in the database 28 to find an acceptable match. If an acceptable match is found, the character corresponding to the matching prototype is output on the display device 20. Otherwise, a message indicating that the character could not be recognized is output on the display device 20. Again, a variety of classifiers have been developed and are well-known in the art. A preferred classifier is a Bayesian classifier based on normal mixture densities. A Bayesian classifier approximates the probability distribution for each prototype and then selects the prototype with the highest probability distribution.

Figure 3:
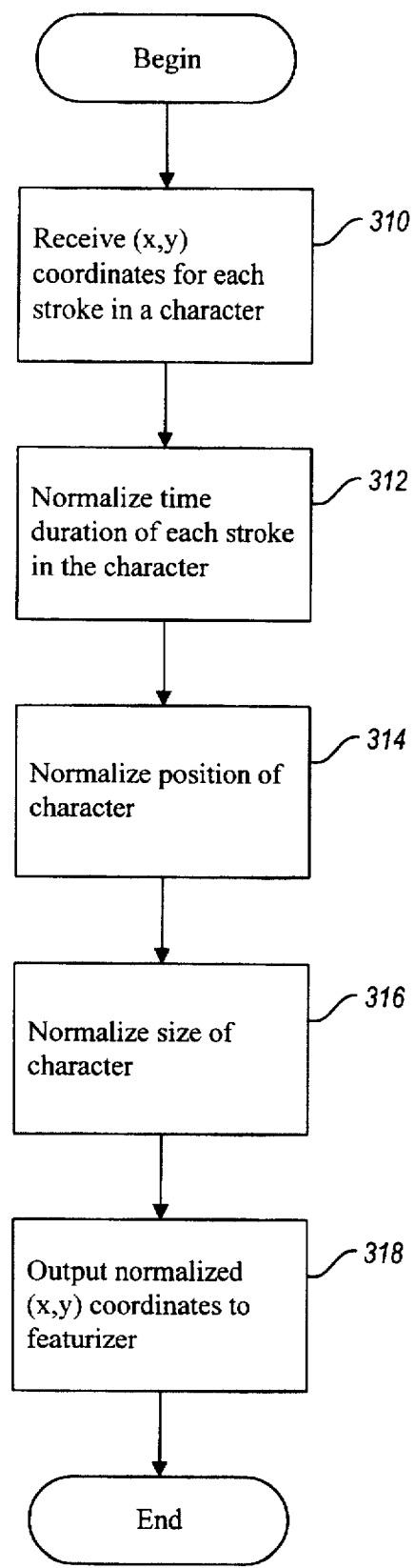
FIG. 3 is a high-level flowchart illustrating the steps performed by a normalizer in the computer of FIG. 2.

The steps performed by the normalizer 22 are shown in greater detail in FIG. 3. Initially, the normalizer 22 receives the (x,y) coordinates for each stroke in the character (step 310). The normalizer 22 first normalizes the time duration of each stroke in the character (step 312). Next, the normalizer 22 normalizes the position of the character (step 314). The normalizer 22 then normalizes the size of the character (step 316). Lastly, the normalizer 22 outputs the normalized (x,y) coordinates to the featurizer 24 (step 318). Each of the three normalizations performed by the normalizer 22 will now be discussed in detail.

The normalizer 22 normalizes the time duration of each stroke (step 312) by generating the Chebyshev polynomials in a time scale to match the time duration of the stroke. The pseudo-code used to normalize the time duration of each stroke is:

nsamples=number of samples in stroke;

nchebyshevs=number of Chebyshev polynomials to be generated;

T[i][j]=array of Chebyshev polynomials;

deltatime=(nsamples−1)/2;

for (j=0; j<nsamples;++j) T[0][j]=1.0;

for (j=0; j<nsamples;++j) T[1][j]=(j/deltatime)−1.0;

for (i=2; i<nchebyshevs;++i) for (j=0; j<nsamples;++j) T[i][j]=2.0*T[i−1][j]*T[1][j]−T[i−2][j];

The above pseudo-code is a modified implementation of the well-known algorithm used to generate Chebyshev polynomials. This algorithm is:

$$T_0(x)=1$$

$$T_1(x)=x$$

$$T_{n+1}(x)=2xT_n(x)-T_{n-1}(x), n \geq 1$$

The modifications to this algorithm are necessary to accomplish the normalizations of the time duration of the stroke.

The normalizer 22 normalizes the position of the character (step 314) by subtracting off the mean of the character in the x and y directions. The pseudo-code used to normalize the position of a character is:

nsamples=number of samples in character;

X[j]=array of x coordinates for all strokes in character;

Y[j]=array of y coordinates for all strokes in character;

sumX=0;

sumY=0;

```
for (j = 0; j < nsamples; ++j)
{
    sumX = sumX + X[j];
    sumY = sumY + Y[j];
}
``` meanX=sumX/nsamples;

meanY=sumY/nsamples;

```
for (j = 0; j < nsamples; ++j)
{
    X[j] = X[j] - meanX;
    Y[j] = Y[j] - meanY;
}
```

The normalizer normalizes the size of the character (step 316) by normalizing the variances in x and y, or alternately, by using the extremal absolute values of x and y. The normalization of the size of the character is preferably performed after the normalization of the position of the character. The pseudo-code used to normalize the size of the character using variance variation is:

nsamples=number of samples in character;

X[j]=array of x coordinates for all strokes in character;

Y[j]=array of y coordinates for all strokes in character;

sumsquareX=0;

sumsquareY=0;

```
for (j = 0; j < nsamples; ++j)
{
    sumsquareX = sumsquareX + X[j]*X[j];
    sumsquareY = sumsquareY + Y[j]*Y[j];
}
``` variancex=squareroot(sumsquareX/nsamples);
varianceY=squareroot(sumsquareY/nsamples);

```
for (j = 0; j < nsamples; ++j)
{
    X[j] = X[j]/varianceX;
    Y[j] = Y[j]/varianceY;
}
```

The pseudo-code used to normalize the size of the character using extremal values variation is:

nsamples=number of samples in stroke;
X[j]=array of x coordinates for all strokes in character;
Y[j]=array of y coordinates for all strokes in character;
Xmin=X[0];
Xmax=X[0];
Ymin=Y[0];
Ymax=Y[0];

```
for (j = 1; j < nsamples; ++j)
{
    Xmin = minimum(Xmin, X[j]);
    Xmax = maximum(Xmax, X[j]);
    Ymin = minimum(Ymin, Y[j]);
    Ymax = maximum(Ymax, Y[j]);
}
```

Xmiddle=(Xmin+Xmax)/2;
Xextent=Xmax−Xmin;
Xnormn=Xextent/2;
Ymiddle=(Ymin+Ymax)/2;
Yextent=Ymax−Ymin;
Ynormn=Yextent/2;

```
for (j = 1; j < nsamples; ++j)
{
    X[j] = (X[j] − Xmiddle)/Xnorm;
    Y[j] = (Y[j] − Ymiddle)/Ynorm;
}
```

Figure 4:
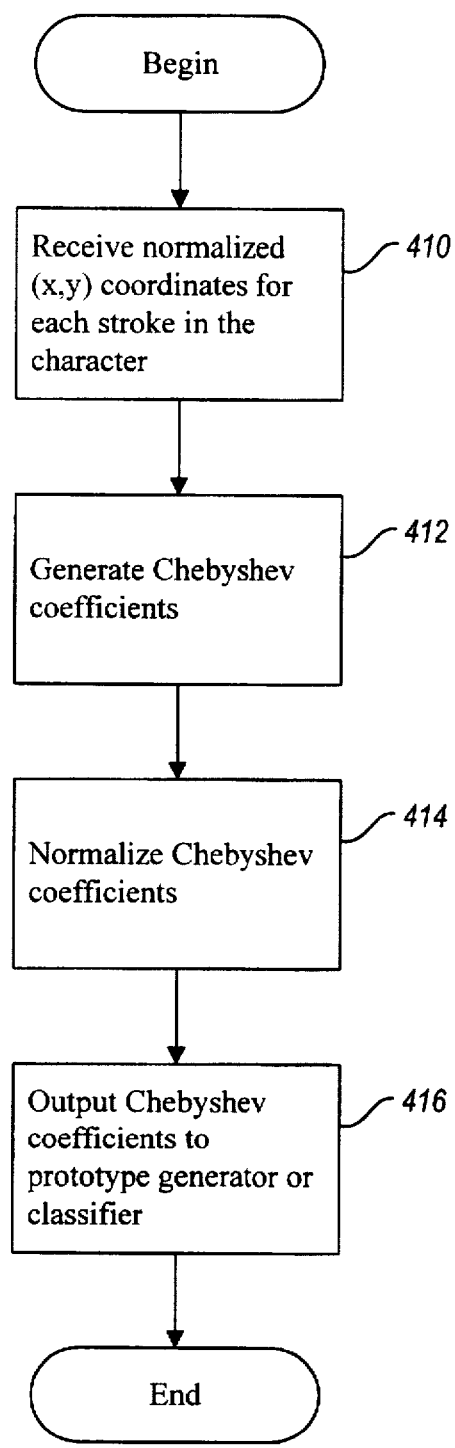
FIG. 4 is a high-level flowchart illustrating the steps performed by a featurizer in the computer of FIG. 2.

The steps performed by the featurizer 24 are shown in greater detail in FIG. 4. Initially, the featurizer 24 receives the normalized (x,y) coordinates for each stroke in the character (step 410). The featurizer 24 generates a set of features that represent each stroke in the character from the normalized (x,y) coordinates (step 412). In the preferred embodiment, the features are Chebyshev coefficients. The featurizer 24 then normalizes the set of Chebyshev coefficients (step 414). Lastly, the featurizer 24 outputs the normalized Chebyshev coefficients to the prototype generator 26 (for training) or the to classifier 30 (for recognition) (step 416). The generation and normalization of the Chebyshev coefficients performed by the featurizer 24 will now be discussed in detail.

The featurizer 24 generates the Chebyshev coefficients (step 412) using the method of least squares applied independently to the normalized x coordinates versus time and to the normalized y coordinates versus time. The functions representing the x and y motions of the pen tip as a function of time can be represented as:

$$x(t) = a_0 T_0 + a_1 T_1 + a_2 T_2 + \ldots + a_n T_n \quad \text{(Eq. 1a)}$$

and $$y(t) = b_0 T_0 + b_1 T_1 + b_2 T_2 + \ldots + b_n T_n \quad \text{(Eq. 1b)}$$

where $a_n$ and $b_n$ are the nth order Chebyshev coefficients for x and y, respectively and $T_n$ is the nth order Chebyshev polynomial. These functions can be generalized as:

$$x(t) = \sum_{i=1}^{nchebyshevs} a_i T_i(t) \quad \text{(Eq. 2a)}$$

and $$y(t) = \sum_{i=1}^{nchebyshevs} b_i T_i(t) \quad \text{(Eq. 2b)}$$

The Chebyshev coefficients $a_i$ and $b_i$ can be estimated using the method of least squares by minimizing the value of $\chi^2$ in the functions:

$$\chi^2 = \sum_{j=1}^{nsamples} \left[ \frac{x(t_j) - \sum_{i=1}^{nchebyshevs} a_i T_i(t_j)}{\sigma_j} \right] \quad \text{(Eq. 3a)}$$

and $$\chi^2 = \sum_{j=1}^{nsamples} \left[ \frac{y(t_j) - \sum_{i=1}^{nchebyshevs} b_i T_i(t_j)}{\sigma_j} \right] \quad \text{(Eq. 3b)}$$

where $\sigma_j$ is the measurement error of the jth coordinate. Since the measurement errors are not known, $\sigma_j$ is set to a constant value of 1. In general, however, there is greater error at the beginning and end of each stroke. Thus, the value of $\sigma_j$ could be increased for the coordinates at the beginning and end of each stroke to account for the greater likelihood of error at these coordinates. Given the arrays x[j] and y[j] in which the normalized (x,y) coordinates are stored, the array a[i][j] in which the Chebyshev polynomials are stored, and the arrays a[i] and b[i] in which the Chebyshev coefficients are stored, these functions can be represented as:

$$\chi^2 = \sum_{j=1}^{nsamples} \left[ \frac{X[j] - \sum_{i=1}^{nchebyshevs} a[i]T[i][j]}{\sigma_j} \right] \quad \text{(Eq. 4a)}$$

and $$\chi^2 = \sum_{j=1}^{nsamples} \left[ \frac{Y[j] - \sum_{i=1}^{nchebyshevs} b[i]T[i][j]}{\sigma_j} \right] \quad \text{(Eq. 4b)}$$

In the preferred embodiment, each character is represented using about 20 Chebyshev coefficients. Thus, the number of Chebyshev polynomials and the number of Chebyshev coefficients generated for each stroke in a character depends upon the number of strokes in the character. For example,

| # of strokes in character | # of Chebyshev coefficients generated |
|---|---|
| 1 stroke | 10 x coefficients |
|  | 10 y coefficients |
| 2 strokes | 5 x coefficients |
|  | 5 y coefficients |

-continued

| # of strokes in character | # of Chebyshev coefficients generated |
|---|---|
| 3 strokes | 4 x coefficients |
|  | 4 y coefficients |
| 4 strokes | 3 x coefficients |
|  | 3 y coefficients |

Since the number of Chebyshev coefficients generated depends upon the number of strokes in the character, one of two approaches may be used to generate the correct number of coefficients. In a preferred approach, 10 x and 10 y Chebyshev coefficients are generated for each stroke in the character and then when the entire stroke has been written, only the number of coefficients corresponding to the number of strokes in the character are used. Alternately, the Chebyshev coefficients are generated after the entire character has been written. At that time, the number of strokes in the character is known and only the necessary number of Chebyshev coefficients are generated.

The featurizer 24 normalizes the set of Chebyshev coefficients (step 414) such that the sum of the squares of the Chebyshev coefficients equals one. This normalization removes the effects of variations in writing size between different characters. The pseudo-code used to normalize the Chebyshev coefficients is:

A[i]=array of Chebyshev coefficients for x for all strokes in character;

B[i]=array of Chebyshev coefficients for y for all strokes in character;

ncoefficients=number of Chebyshev coefficients for each x and y for
all strokes in character;
sumsquare=0;

```
for (i = 0; i < ncoefficients; ++i)
{
    sumsquare = sumsquare + A[i]*A[i];
    sumsquare = sumsquare + B[i]*B[i];
}
norm = squareroot(sumsquare);
for (i = 0; i < ncoefficients; ++i)
{
    A[i] = A[i]/norm;
    B[i] = B[i]/norm;
}
```

Figure 5:
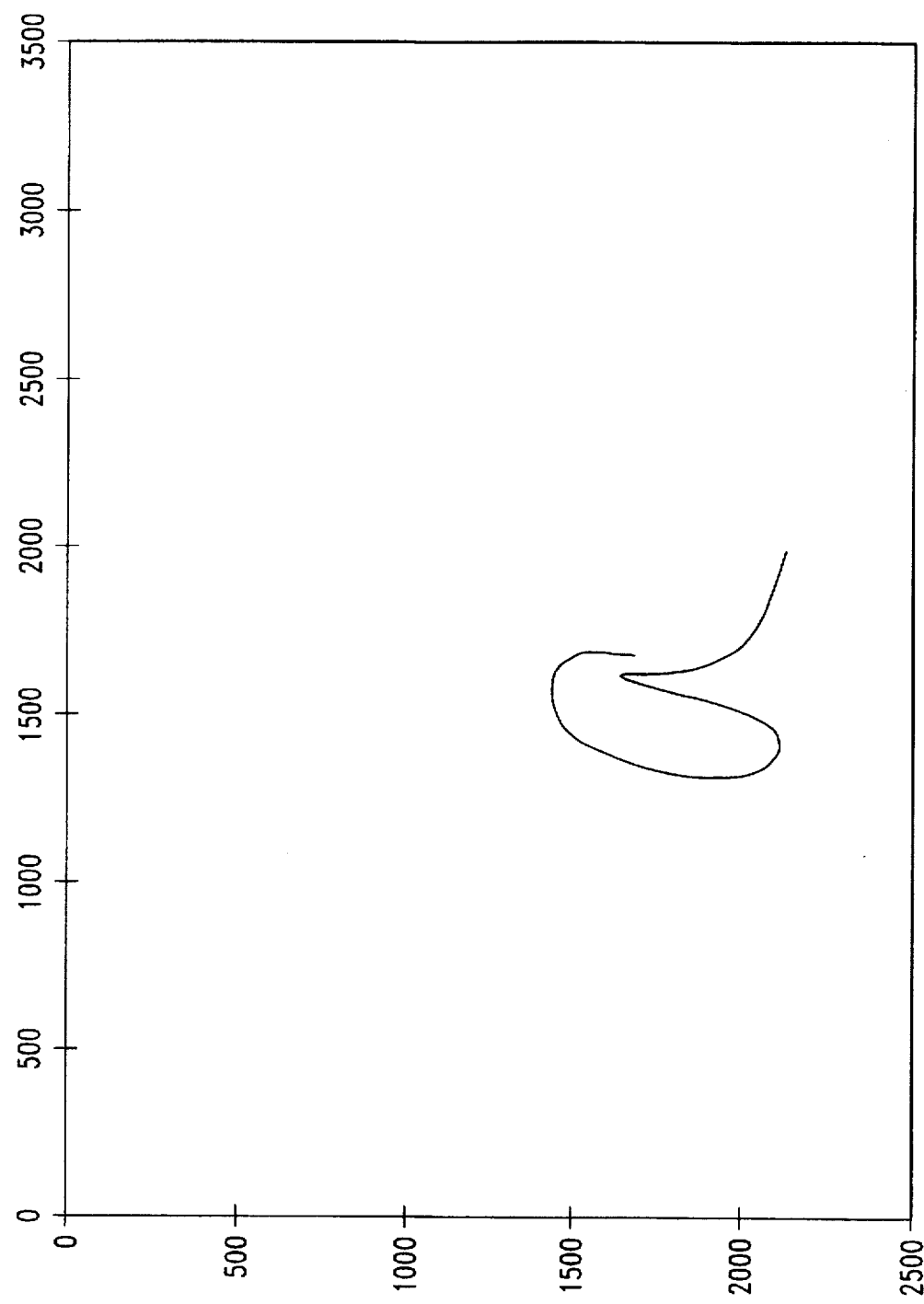
FIG. 5 is a graph of a character as originally written.
Figure 7:
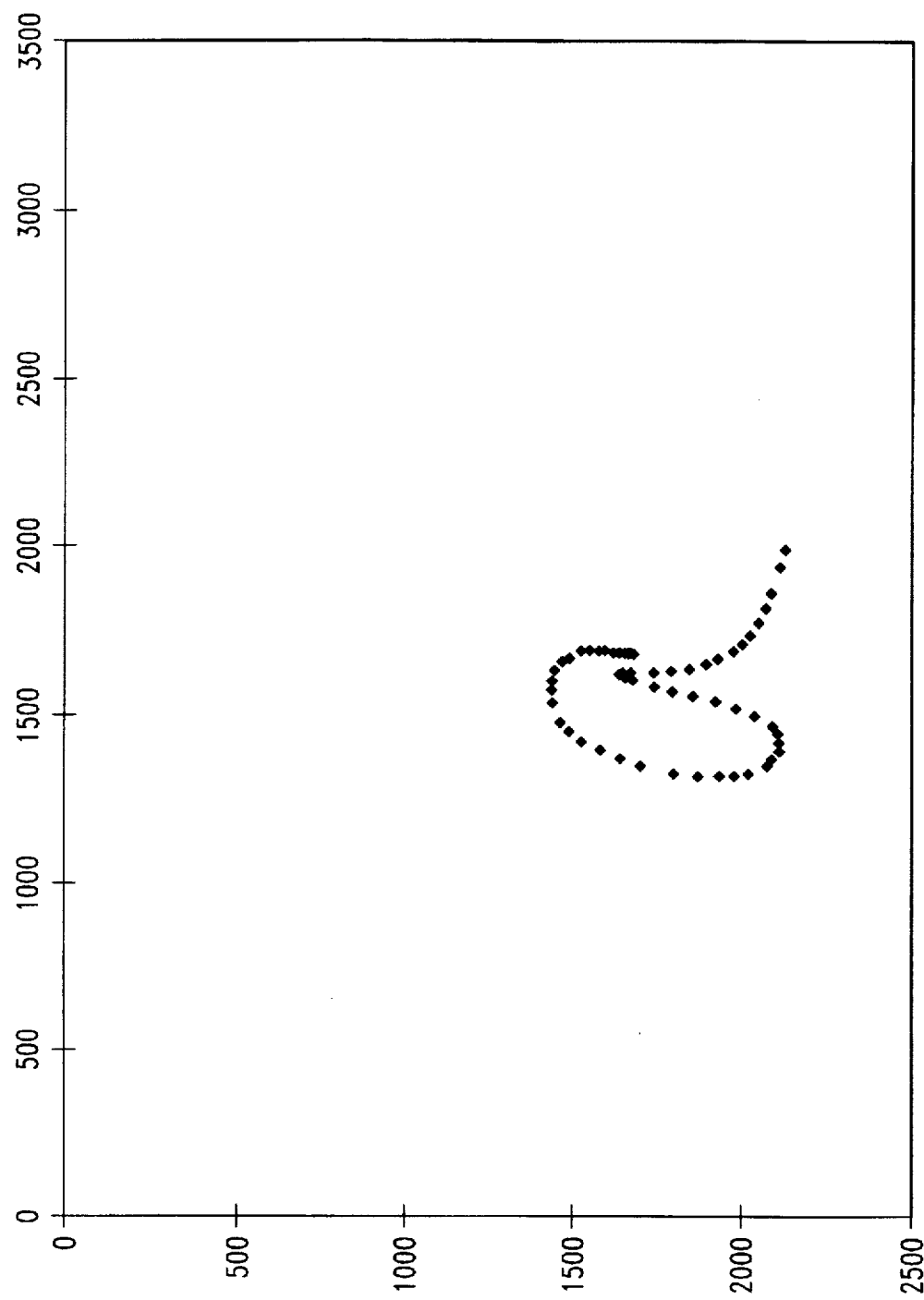
FIG. 7 is a graph of the (x,y) coordinates of FIG. 6 as discrete points.
Figure 8:
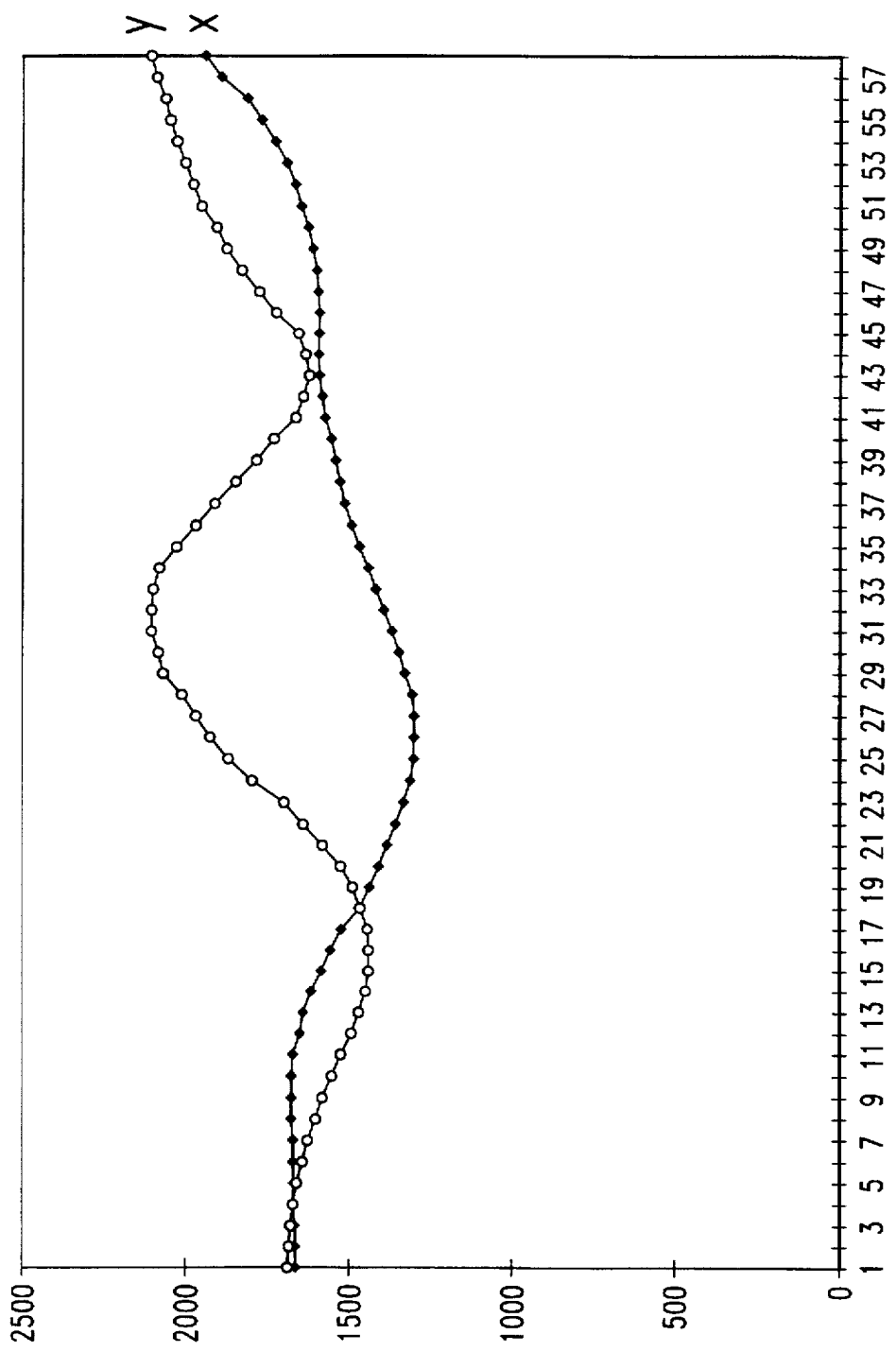
FIG. 8 is a graph of the x and y coordinates of FIG. 6 as a function of time.

FIGS. 5–13 collectively illustrate the principles of the handwriting recognition system of the present invention. FIG. 5 shows a graph of the lowercase letter "a" as originally written on the tablet using the pen. The tablet sampled the location of the pen tip on the tablet from pen down until pen up at a sampling rate of 100 samples per second as the letter was written. The (x,y) coordinates representing the sampled locations of the pen tip on the tablet for the single stroke in the letter are shown in FIG. 6. There are 58 pairs of (x,y) coordinates. Thus, the letter took approximately 0.58 seconds to write. FIG. 7 shows a graph of the sampled locations of the pen tip as discrete points. FIG. 8 shows a graph of the x and y coordinates as a function of time, where the x-axis represents time and the y-axis represents the x and y coordinates of the pen tip on the tablet.

Figure 9:
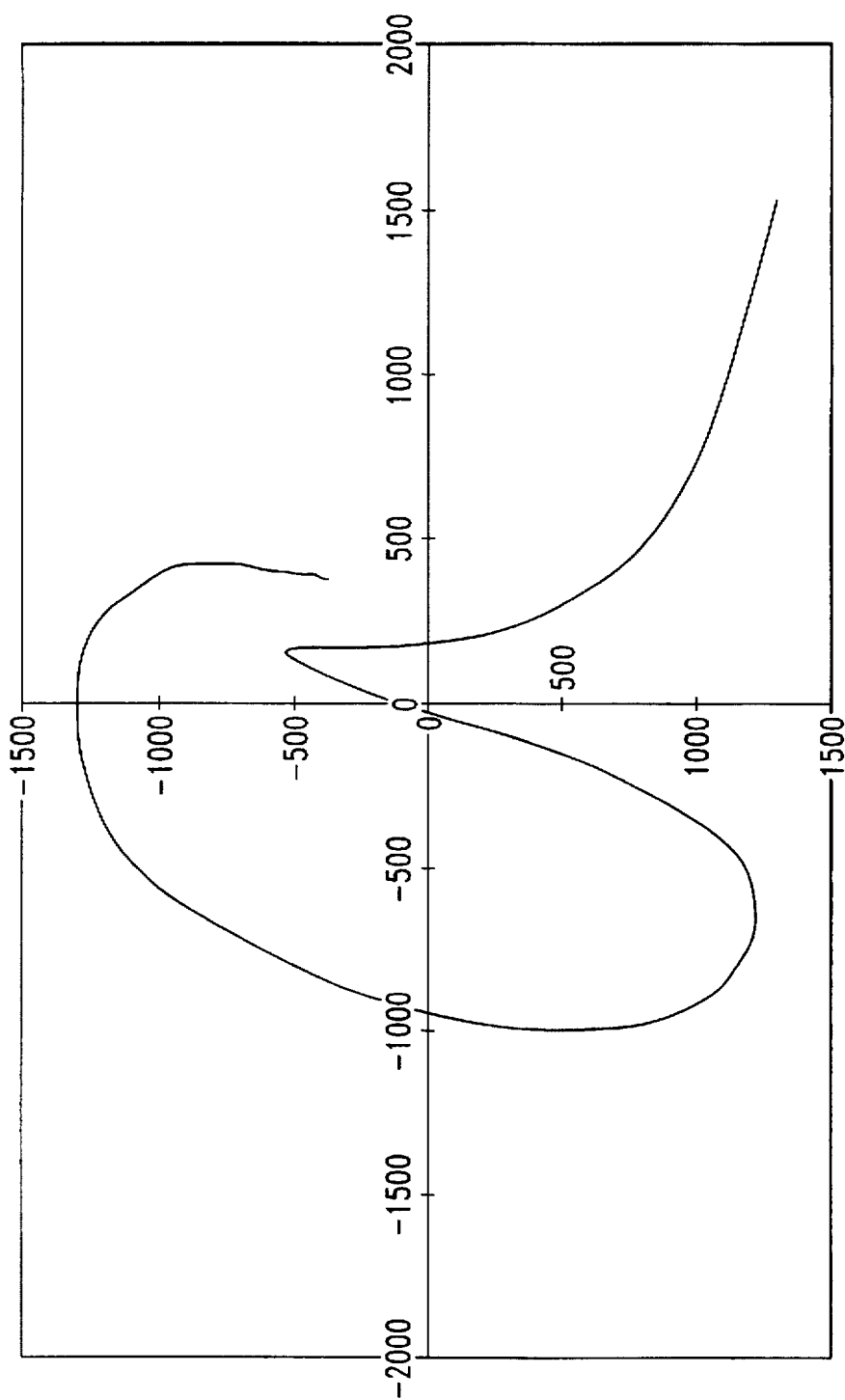
FIG. 9 is a graph of the character of FIG. 5 after the position and size of the character have been normalized.
Figure 11:
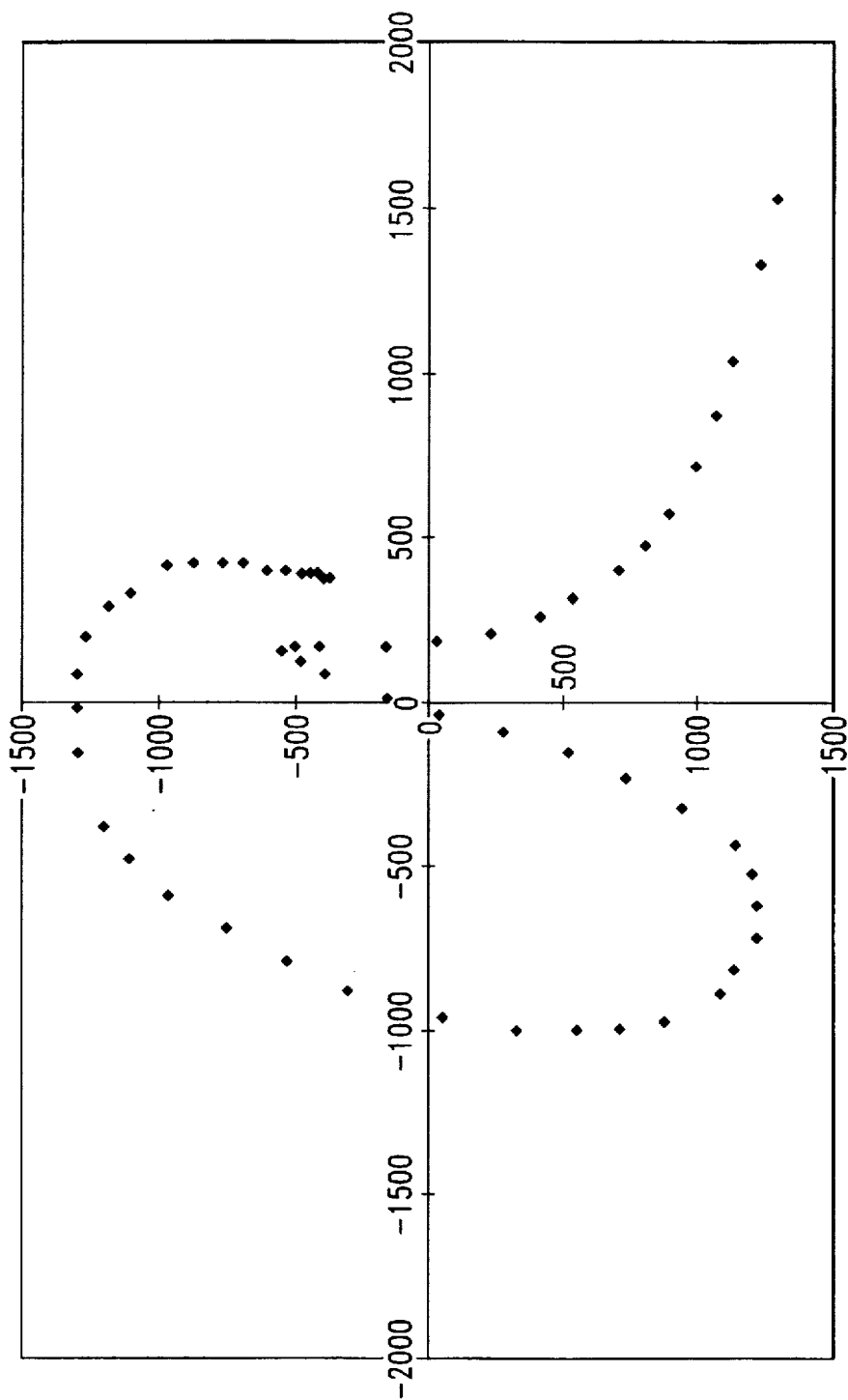
FIG. 11 is a graph of the normalized (x,y) coordinates of FIG. 10 as discrete points.
Figure 12:
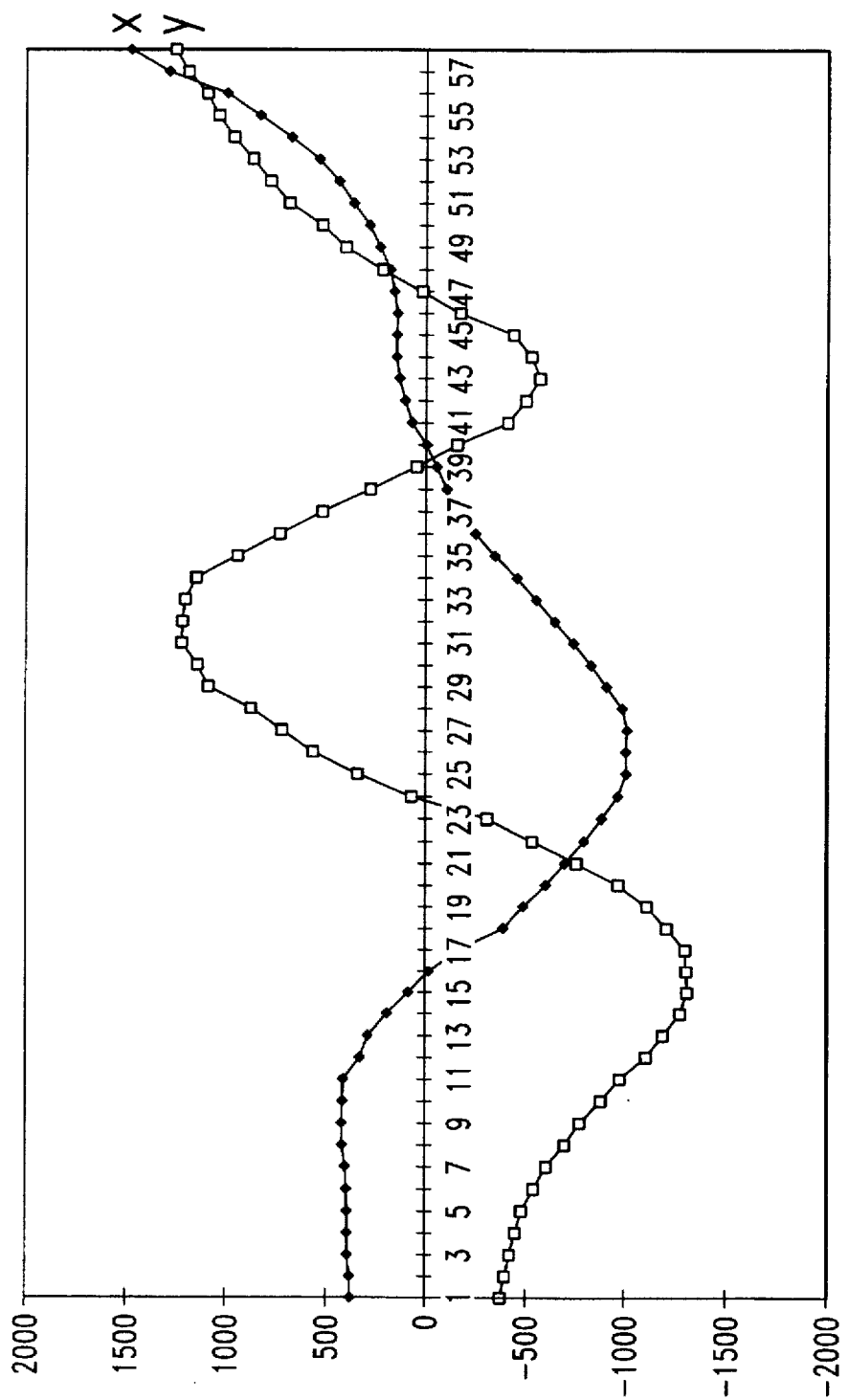
FIG. 12 is a graph of the normalized x and y coordinates of FIG. 10 as a function of time.

After receiving the (x,y) coordinates for the single stroke in the letter from the tablet, the normalizer normalized the time duration of the stroke in the letter and normalized the position and size of the letter. FIG. 9 shows a graph of the lowercase letter "a" after the position and size normalizations have been performed. The normalized (x,y) coordinates for the single stroke in the letter are shown in FIG. 10. FIG. 11 shows a graph of the normalized locations as discrete points. FIG. 12 shows a graph of the normalized x and y coordinates as a function of time, where the x-axis represents time and the y-axis represents the normalized x and y coordinates.

After receiving the normalized (x,y) coordinates for the single stroke in the letter from the normalizer, the featurizer generates the set of Chebyshev coefficients that represent the stroke. The set of Chebyshev coefficients are shown in FIG. 13. These Chebyshev coefficients can be stored in memory as a compact representation of the letter "a," input to the prototype generator and used to generate a prototype of the letter "a," or input to the classifier and used to recognize the letter "a."

One of ordinarily skill in the art will now appreciate that the present invention provides a method and system for modeling and recognizing handwriting using polynomials as a function of time. Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims.

What is claimed is:

1. A method for recognizing handwriting in a computer system, the handwriting being written on an electronic tablet using an electronic pen, the handwriting comprising at least one character, each character comprising at least one stroke, the method comprising the computer-implemented steps of:

for each character in the handwriting,
    for each stroke in the character,
        obtaining a plurality of coordinates representing the location of a pen tip on a tablet from pen down until pen up at periodic intervals as the stroke is written,
        normalizing the (x, y) coordinates;
        generating coefficients of a Chebyshev polynomial to approximate the normalized (x,y) coordinates;
    comparing the generated coefficients for all strokes in the character to a plurality of stored prototypes, each prototype comprising coefficients generated from an allowable character;
    determining whether the generated coefficients match any of the stored prototypes; and
    when there is a match, outputting the character corresponding to the stored prototype that matches the generated coefficients.

2. The method of claim 1, wherein the step of normalizing the (x,y) coordinates comprises the step of normalizing a time duration of each stroke in the character.

3. The method of claim 1, wherein the step of normalizing the (x,y) coordinates comprises the step of normalizing a position of the character.

4. The method of claim 1, wherein the step of normalizing the (x,y) coordinates comprises the step of normalizing the size of a character.

5. The method of claim 1, wherein the step of generating coefficients comprises the step of generating coefficients using the method of least squares applied to the normalized x coordinates versus time and to the normalized y coordinates versus time.

6. The method of claim 1, wherein the step of generating coefficients comprises the step of generating a predetermined number of coefficients based upon the number of strokes in the character.

7. The method of claim 6, wherein the number of coefficients generated for each character is approximately twenty.

8. The method of claim 1, further comprising the step of, for each character in the handwriting, normalizing the generated coefficients.

9. A computer system for recognizing handwriting, the handwriting being written on an electronic tablet using an electronic pen, the handwriting comprising at least one character, each character comprising at least one stroke, the system comprising;
- a tablet for obtaining a plurality of (x,y) coordinates representing the location of a pen tip on a tablet from pen down until pen tip at periodic intervals as a stroke in a character is written;
- a normalizer for normalizing the (x,y) coordinates;
- a featurizer for generating coefficients of a Chebyshev polynomial to approximate the handwriting from the normalized (x y) coordinates;
- a prototype generator for generating prototypes of allowable characters, each prototype comprising coefficients generated from an allowable character;
- a database for storing the prototypes of the allowable characters;
- a classifier for comparing the coefficients representing a character to be recognized to the stored prototypes and determining whether the coefficients match any of the stored prototypes; and
- a display device for outputting the character corresponding to the stored prototype that matches the coefficients.

10. A computer-readable medium containing instructions for causing a computer system to recognize handwriting, the handwriting being written on an electronic tablet using an electronic pen, the handwriting comprising at least one character, each character comprising at least one stroke, by:
for each character in the handwriting,
   for each stroke in the character,
      obtaining a plurality of coordinates representing the location of a pen tip on a tablet from pen down until pen up at periodic intervals as the stroke is written;
   normalizing the (x, y) coordinates;
   generating coefficients of a Chebyshev polynomial to approximate the normalized (x, y) coordinates as a function of time;
   comparing the generated coefficients for all strokes in the character to a plurality of stored prototypes, each prototype comprising coefficients generated from an allowable character;
   determining whether the generated coefficients match any of the stored prototypes; and
   when there is a match, outputting the character corresponding to the stored prototype that matches the generated coefficients.

11. The computer-readable medium of claim 10 wherein the normalizing of the (x, y) coordinates comprises normalizing a time duration of each stroke in the character.

12. The computer-readable medium of claim 10 wherein the normalizing of the (x, y) coordinates comprises normalizing a position of the character.

13. The computer-readable medium of claim 10 wherein the normalizing of the (x, y) coordinates comprises normalizing the size of a character.

14. The computer-readable medium of claim 10 wherein the generating of coefficients comprises generating coefficients using the method of least squares applied to the normalized x coordinates versus time and to the normalized y coordinates versus time.

15. The computer-readable medium of claim 10 wherein the generating of coefficients comprises generating a predetermined number of coefficients based upon the number of strokes in the character.

* * * * *